United States Patent [19]

Berger et al.

[11] Patent Number: 4,989,457

[45] Date of Patent: Feb. 5, 1991

[54] DEFLECTION MEASURING ROLLER

[75] Inventors: Bernd Berger, Kaarst; Gert Mucke, Hilden; Eberhart Neuschutz, Ratingen; Helmut Thies, Kaarst, all of Fed. Rep. of Germany

[73] Assignee: Betriebsforschungsinstitut VDEh Institut fur angewandte Forschung, GmbH, Dusseldorf, Fed. Rep. of Germany

[21] Appl. No.: 407,050

[22] Filed: Sep. 14, 1989

[30] Foreign Application Priority Data

Sep. 15, 1988 [DE] Fed. Rep. of Germany ....... 3831331

[51] Int. Cl.$^5$ .............................................. G01L 5/04
[52] U.S. Cl. .................... 73/862.07; 73/862.54
[58] Field of Search ........... 73/862.07, 862.38, 862.54, 73/862.62, 768

[56] References Cited

U.S. PATENT DOCUMENTS

| | | | |
|---|---|---|---|
| 2,898,761 | 8/1959 | Hast | 73/862.69 |
| 4,127,027 | 11/1978 | Berger et al. | 73/862.07 |
| 4,366,720 | 1/1983 | Berger et al. | 73/862.07 |
| 4,611,497 | 9/1986 | Knabel et al. | 73/862.68 |

*Primary Examiner*—Charles A. Ruehl
*Attorney, Agent, or Firm*—Staas & Halsey

[57] ABSTRACT

A deflection measuring roller includes mutually non-rotatable rings having force sensors for determining the stress distribution of undirected, flexible strips. A receiving chamber is made of a window which is formed in the material of the annular wall and within which the force sensor and wedge are provided.

8 Claims, 2 Drawing Sheets

DEFLECTION MEASURING ROLLER

BACKGROUND OF THE INVENTION

The invention relates to a deflection measuring roller comprising mutually non-rotatable rings having force sensors for determining the stress distribution of undirected, flexible strips, wherein inner receiving chambers are provided for the rings and non-positively held force sensors are acted upon in these receiving chambers via the ring surface associated therewith.

Such a deflection measuring roller is described in DE-PS No. 26 30 410. In this case, an armature is set in a recess of the ring receiving the force sensor, this armature protruding by means of a screw bolt on the inside of the ring. By means of a screw nut the armature can be clamped firmly in the recess, so that finally the end of its outer surface ends at the cylindrical generatrix of the ring, against which it acts on the force sensor by means of the inner, annular shoulder via pressure elements. The connection terminal for conduction of the measured voltage is connected to these pressure elements. The fixing of the force sensor results in a linear, hysteresis-free characteristic. However, a high pre-tension force has to be applied for this by means of the screw nut. A disadvantage as regards the large constructional height is a low degree of rigidity of the remaining material of the ring by comparison with the force sensor itself.

SUMMARY OF THE INVENTION

Taking this as a starting point, the invention is based on the object of finding an arrangement having a lower constructional height, in which the rigidity of the ring is reduced to a lesser extent and the pre-tension force can be kept smaller.

A deflection measuring roller includes mutually non-rotatable rings having force sensors for determining the stress distribution of undirected, or unguided flexible strips, in which inner receiving chambers are provided for the rings. Non-positively held force sensors are acted upon in these receiving chambers via the ring surface associated therewith. The receiving chamber is constructed as a window formed in the material of the wall of the ring. Receiving surfaces which oppose one another in the impact direction of the force sensor are located in this window. Wedge means of self-locking inclination bears against at least one of those receiving surfaces and holds the force sensor in a clamped position.

In the manner according to the invention, there is no longer a break through the inside of the rings in the construction of the receiving chamber; rather, the inside is maintained complete. Furthermore, by the omission of the clamping screw and the screw nut required for its actuation there results a very low constructional height, since apart from the force sensor only the wedge arrangement still has to be accommodated in the window. As a result, the annular wall is weakened substantially less by the windows and the force sensors set therein, with their wedge arrangements, than with the known embodiment of the receiving chamber. A further advantage here is that a correspondingly reduced clamping path is required, which can easily be brought about through the wedge arrangement. Thus, the rigidity of the ring remains considerably better than hitherto while at the same time reducing the pre-tension force.

Since the force sensor and wedge arrangement are introduced into the window, assembly is consequently simplified so that installation errors are largely avoided. Finally, the stresses acting on the sides of the window and the force sensor remain restricted to the minimum as a result of the large supporting surfaces, as can be produced with wedges, so that damage during installation and dismantling can be eliminated.

In the most simple embodiment of the invention the wedge surfaces are made on the one hand on one window side and on the other hand on the corresponding side of the force sensor. In this case, the wedge arrangement is possible without additional elements, while at the same time the minimum constructional height and thus the minimum size of recess for the window are achieved.

Where only one window side is made inclined but the force sensor is plane-parallel with respect to its opposing impact surface, one wedge element is required whereof the inclined surface bears against the inclined window surface. Conversely, a single wedge element is again sufficient if the surfaces of the window facing one another are plane-parallel but the force sensor is made with an inclined surface. In this case the inclined surface of the wedge bears against the oblique surface of the force sensor.

In many cases the wedge arrangement comprises two wedge elements. Where the force sensor and the window walls are plane-parallel surfaces, a double wedge of this type with mutually inclined oblique surfaces is inserted between the force sensor and the window.

Where the force sensor is plane-parallel but has impact surfaces running oblique with respect to its vertical faces, the inclination of these oblique surfaces is compensated by the inclined surface of a respective wedge, so that installation in a window whereof sides facing one another run perpendicularly with respect to the impact direction is possible. On the other hand, in the case of oblique but mutually parallel impact surfaces in the window, the wedge arrangement can be such that similarly a respective wedge element is arranged between the force sensor and the window surfaces, the oblique surfaces of both wedge elements however facing the oblique surfaces of the window. The receiving surfaces of the window or of the impact surfaces of the force sensor can, instead of being plane-parallel, also each be mutually inclined where correspondingly mutually inclined surfaces of the wedges correspond thereto.

Particular security is provided for the installation in that the receiving surfaces facing one another of the window of the annular wall are made recessed. The recessed embodiment is advantageously made such that it results first in a positive connection with respect to the force sensor introduced and, where appropriate, with respect to the wedge arrangement. During assembly only the provision of the non-positive connection must then be ensured.

In a further development of the invention, a thin, resiliently deformable intermediate web remains in the annular wall in the window between the force sensor and the wedge. While the force sensor is first introduced into the window with positive connection, the non-positive connection is only brought about in that a wedge is driven into the free space between the annular wall and the intermediate web. Thanks to this arrangement, direct influences of the wedge on the force sensor can be avoided, so that damage caused thereby can be reliably prevented.

The surfaces coming into contact with one another, of the window, the force sensor and where appropriate the wedges are produced by fine machining, so that the surface roughness (average roughness depth) is in particular less than 16 μ.

For further illustration of the invention, reference is made to the drawings relating to exemplary embodiments, in which.

DESCRIPTION OF THE PREFERRED EMBODIMENTS

Figure 1:
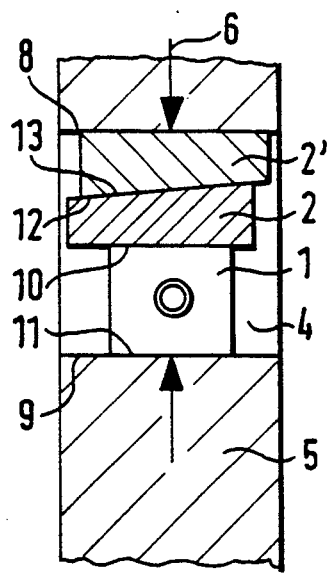
FIG. 1 shows the arrangement of the invention with mutually plane-parallel surfaces perpendicular to the impact direction, both of the force sensor and of the window.

In accordance with FIG. 1, there can be seen the annular wall 5, within which the window 4 is made. The mutually opposing receiving surfaces 8 and 9 are plane-parallel to one another and perpendicular with respect to the impact direction 6. The force sensor 1 is set in the window and its impact surfaces 10 and 11 are similarly mutually parallel and are further parallel to the receiving surfaces 8, 9 of the window 4.

Between the impact surface 10 and the receiving surface 8 there is the arrangement of the wedge 2, 2', which is made as a pair of inclined surfaces 12, 13 corresponding to one another and facing one another. The angles of inclination of these inclined surfaces 12, 13 fulfill the requirement for self-locking. As can be seen from FIG. 1 with respect to these inclined surfaces, displacement of the wedges 2, 2' in the plane of the drawing perpendicular to the impact direction 6 results in a clamping tension between the surface of the window and of the force sensor, or in the removal of the clamping tension. This arrangement allows the force sensor and the wedge 2 to be held immovable when the wedge 2' is driven in, so that damage by displacement against the force sensor itself is prevented.

Figure 2:
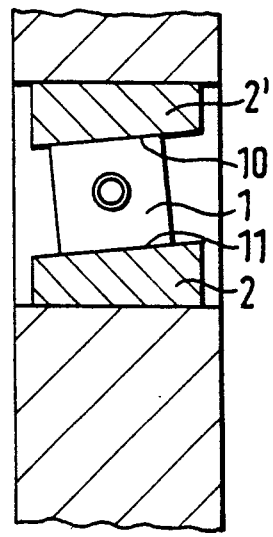
FIG. 2 shows the arrangement with oblique impact surfaces of the force sensor.

In accordance with FIG. 2, a force sensor having oblique surfaces of the force sensor 1 with respect to the impact direction 6 is used. In accordance with this, the force sensor is installed between the two wedges 2 and 2' so that the inclination of the oblique surfaces 10 and 11 is compensated by the corresponding inclined surfaces of the wedges 2 and 2'.

Figure 3:
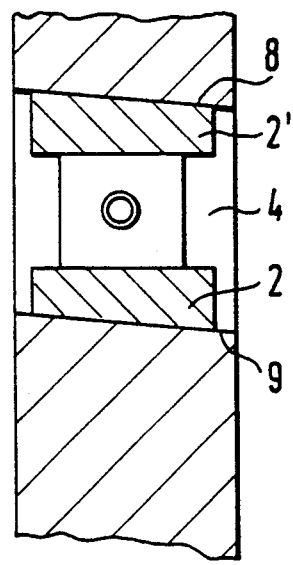
FIG. 3 shows the arrangement with oblique load surfaces of the window.

FIG. 3 shows in converse manner how an arrangement of the wedges 2 and 2' within the window 4 may be found if the receiving surfaces 8, 9 of the window are oblique. In this case, the oblique surfaces of the wedges 2 and 2' face the corresponding oblique surfaces of the window.

Figure 4:
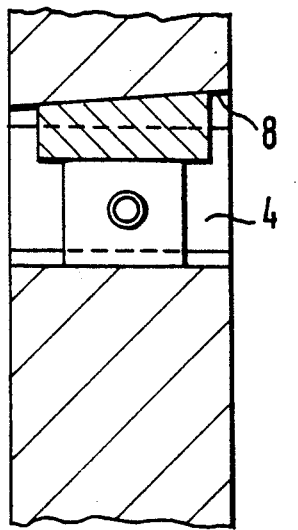
FIG. 4 shows the arrangement with one oblique load surface of the window.

In accordance with FIG. 4, only one wedge is required if one receiving surface 8 of the window 4 is inclined.

Figure 5:
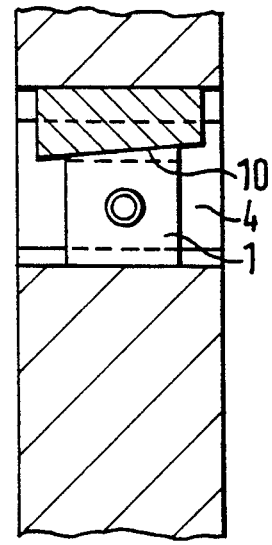
FIG. 5 shows the arrangement with one oblique surface of the force sensor.

FIG. 5 relates to the opposite case, in which the receiving surfaces of the window 4 are plane-parallel to an impact surface of the force sensor 1 and runs perpendicular to the direction of loading, while the other impact surface of the force sensor 1 is inclined In accordance with this, a wedge is used which has a correspondingly inclined surface.

Figure 6:
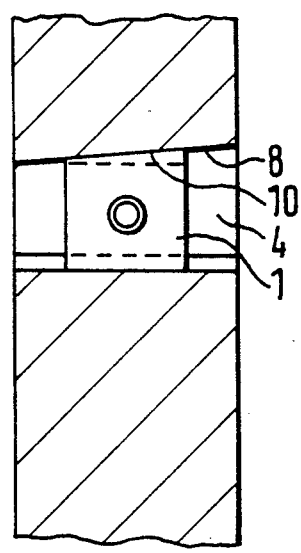
FIG. 6 shows the arrangement with one oblique load surface of the window and a corresponding surface of the force sensor.

The arrangement of FIG. 6 enables a wedge of any kind to be dispensed with where the receiving surface 8 and the impact surface 10 of the force sensor run obliquely in the same manner, the final position of the force sensor within the window, however, being fixed. Thus, in contrast with FIG. 1, for example, this final position can no longer be chosen freely.

Figure 7:
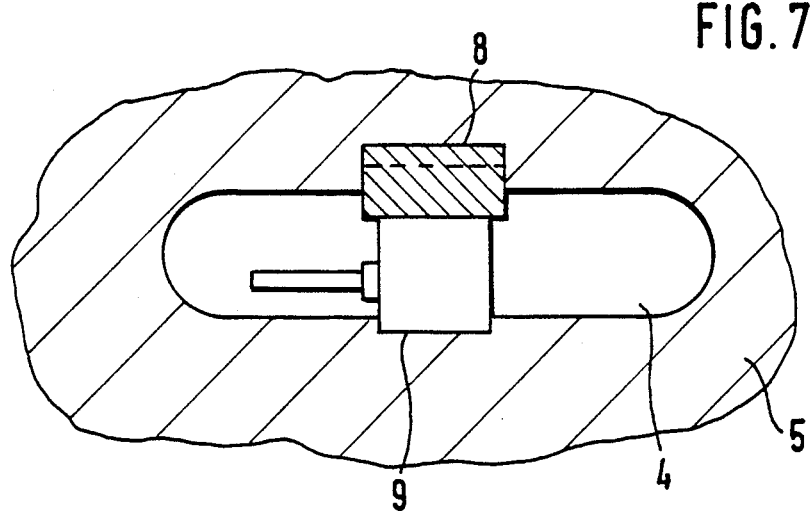
FIG. 7 shows one method of installation of the force sensor and wedge.

In accordance with the embodiment of FIG. 7, the height of the window 4 within the annular wall is in general reduced, the receiving surfaces being recessed. Thus, it can be seen that the receiving surface 9 is matched in positive connection to the force sensor, while the receiving surface 8 is correspondingly adapted to the wedge As described above, with such an arrangement, an error through incorrect insertion in the force sensor or wedge can be reliably prevented.

Figure 8:
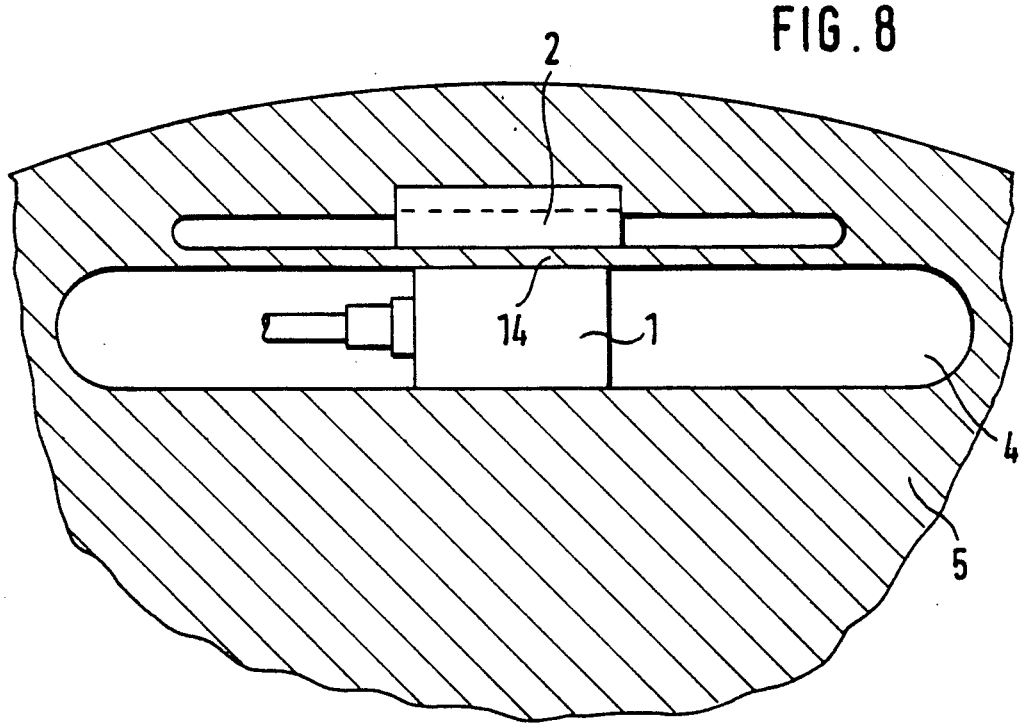
FIG. 8 shows another method of installation of the force sensor and wedge.

FIG. 8, finally, shows an intermediate web 14 between the wedge 2 and the force sensor 1 within the window 4. This intermediate web 14 remains during machining and comprises the same material as the annular wall 5. However, its thickness is chosen such that it can undergo a resilient deformation when the wedge 2 is driven in to fix the force sensor 1.

We claim:

1. A deflection measuring roller, comprising: mutually non-rotatable rings having force sensors for determining the stress distribution of flexible strips, in which inner receiving chambers are provided for the rings, non-positively held force sensors being acted upon in these receiving chambers via the ring surface associated therewith wherein the receiving chamber of each ring is constructed as a window formed in the material of the wall of the ring, receiving surfaces which oppose one another in the impact direction of the force sensor are located in this window, and wedge means of self-locking inclination bears against at least one of these receiving surfaces and holds the force sensor in a clamped position.

2. The roller according to claim 1, wherein the receiving surfaces of the window facing one another and the impact surfaces of the force sensor run parallel to one another, and wherein the wedge means comprises a double wedge having inclined surfaces facing one another and is provided on one side between the force sensor and the window.

3. The roller according to claim 2, wherein the wedge means includes a wedge surface formed by at least one of the receiving surfaces of the window.

4. The roller according to claim 3, wherein the receiving surfaces of the window are recessed in the wall of the ring.

5. The roller according to claim 4, wherein there is a thin, resiliently deformable intermediate web of the wall of the ring in the ring in the window between the force sensor and the wedge means.

6. The roller according to claim 1, wherein the force sensor is held clamped on both sides by wedges forming the wedge means, and impact surfaces of the force sensor are oblique relative to the receiving surfaces.

7. The roller according to claim 1, wherein the force sensor is held clamped on both sides by wedges forming the wedge means, and the receiving surfaces of the window are oblique relative to impact surfaces of the force sensor.

8. The roller according to claim 1, wherein the wedge means comprises a wedge surface formed by an impact surface of the force sensor and a wedge disposed between said wedge surface and one of the receiving surfaces.

* * * * *